July 29, 1924.  1,502,908

C. P. COZATT

SPRING WHEEL

Filed Nov. 14, 1923  2 Sheets-Sheet 1

Witnesses:  Inventor
C. P. Cozatt

Attorney

July 29, 1924.
C. P. COZATT
SPRING WHEEL
Filed Nov. 14, 1923   2 Sheets-Sheet 2
1,502,908
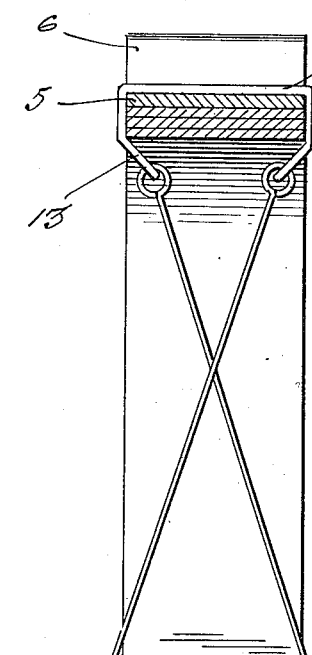
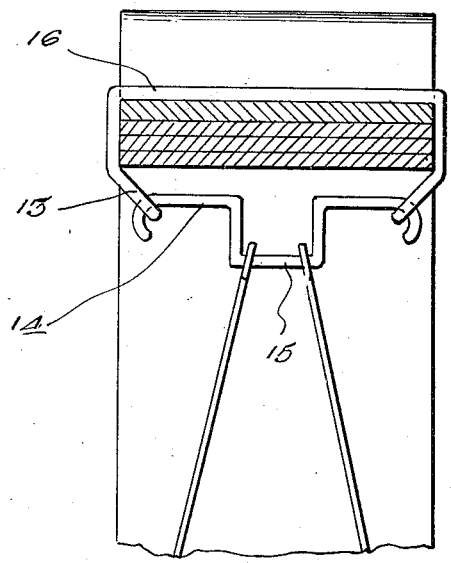
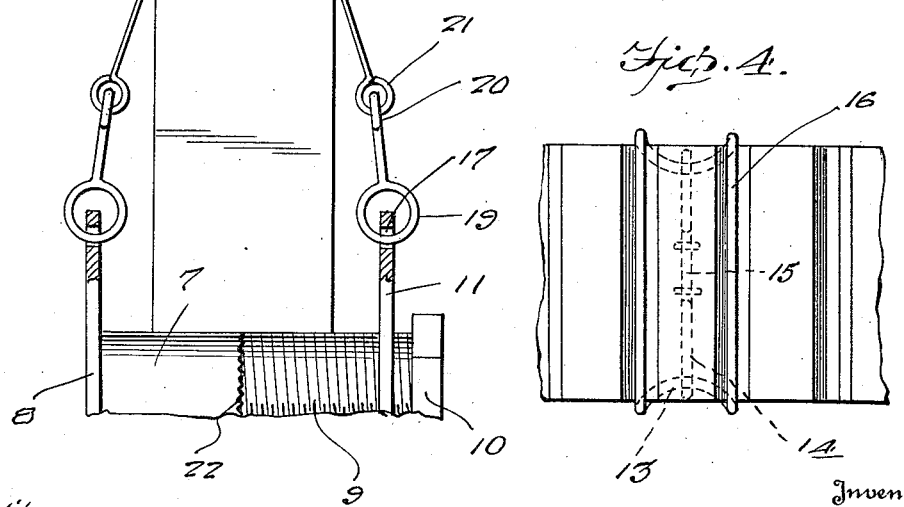

Patented July 29, 1924.

1,502,908

UNITED STATES PATENT OFFICE.

COMMODORE PERRY COZATT, OF DANVILLE, ILLINOIS.

SPRING WHEEL.

Application filed November 14, 1923. Serial No. 674,702.

*To all whom it may concern:*

Be it known that I, COMMODORE PERRY COZATT, citizen of the United States, residing at Danville, in the county of Vermilion and State of Illinois, have invented certain new and useful Improvements in Spring Wheels, of which the following is a specification.

This invention relates to certain new and useful improvements in spring wheels, and has particular reference to a spring wheel of that type embodying a resilient deformable tire carrying rim.

The primary object of the invention is to generally simplify and improve spring wheels of the above character, whereby the same will be extremely efficient in action for effectively absorbing shock and strain, and to thereby meet with all of the requirements for a successful commercial use.

Another object of the invention is to provide a spring wheel of simple and durable construction, and capable of cushioning torsional strains between the hub and rim of the wheel such as are experienced when the wheel is used as a driven supporting wheel for motor vehicles.

A further object of the invention is to provide a resilient wheel of the above kind with efficient means for readily and expeditiously placing the wire spokes thereof under proper tension from time to time as found necessary during the continued use of the wheel.

A still further object of the invention is to provide a spring wheel for general use or for use upon motor vehicles which will give all of the yielding qualities of a pneumatic tired wheel while at the same time not being open to the objection of liability of punctures by which the latter are characterized.

Other objects will appear as the nature of the invention is better understood, and the same consists in the novel form, combination and arrangement of parts hereinafter more fully described, shown in the accompanying drawings and claimed.

In the drawings, wherein like reference characters indicate corresponding parts throughout the several views:

Figure 3 is an enlarged transverse sectional view, taken substantially upon the line 3—3 of Figure 1, Figure 4 is a plan view of the device shown in Figure 3, and Figure 5 is a fragmentary radial sectional view illustrating a modification of the invention.

Figure 1:
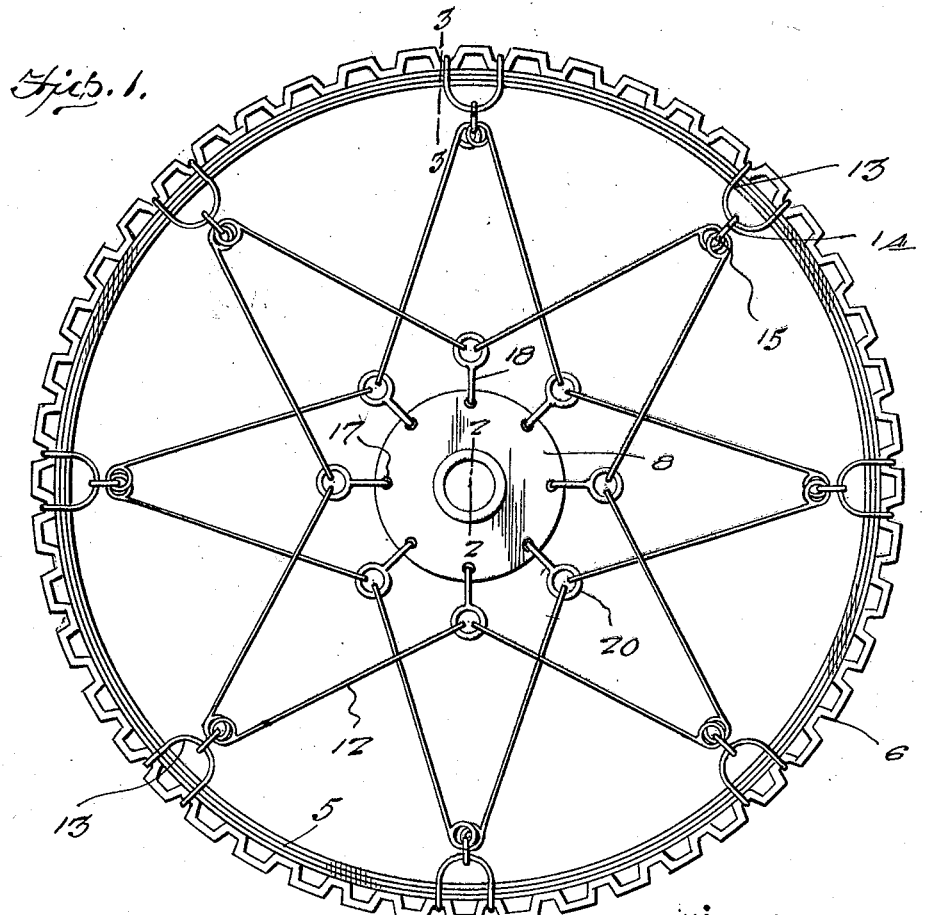
Figure 1 is a side elevational view of a resilient wheel constructed in accordance with the present invention.
Figure 2:
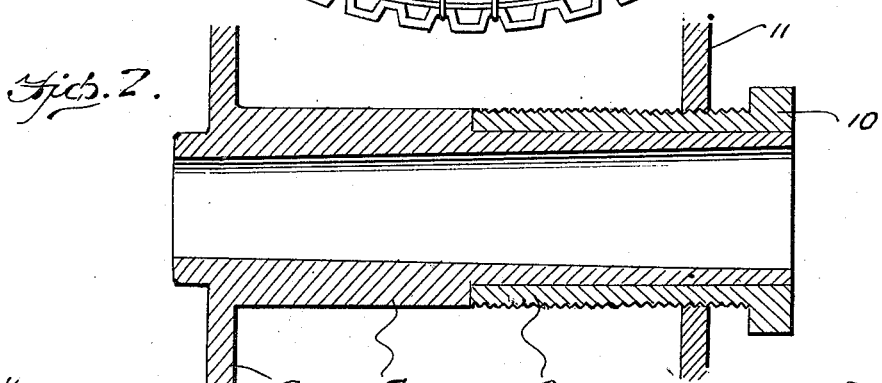
Figure 2 is an enlarged fragmentary transverse sectional view, taken substantially upon the line 2—2 of Figure 1, showing details of the hub construction.

Referring more in detail to the drawings, the present invention embodies a resilient sheet metal rim which may consist of one or more spring metal bands 5, depending upon the thickness of metal employed and the amount of weight to be imposed upon the wheel. In the form of the invention shown, the rim is shown as three ply or composed of three separable concentric and contiguous bands, but which may be secured together by welding, soldering, or the like, which rim has a tire 6 disposed about the same that is preferably constructed of corrugated resilient metal as shown clearly in Figure 1, whereby effective tractive effort is insured.

Normally concentric with and within the rim is a hub composed of a tubular section 7 having an integral external annular flange 8 upon one end thereof, and reduced at its other end, an externally threaded sleeve 9 being rotatably disposed upon the reduced end of the section 7. The outer end of the sleeve 9 is provided with a polygonal head as at 10 whereby the same may be engaged by a wrench for rotating the same, and an internally threaded flange 11 is screwed upon the sleeve 9 for movement longitudinally of the latter, it being noted that the sleeve 9 is held in place by any suitable means.

The hub is connected in concentric relation to the rim by means of a plurality of tangential spokes 12 that are preferably of wire, and that are arranged in pairs, with the spokes of each pair arranged in inwardly diverging relation, as shown in Figure 1. As is also shown in the above figure, the inner end portion of each spoke crosses the inner end portion of an adjacent spoke of the adjacent pair, and the spokes are pivotally connected at their outer ends to ears 13 carried by the rim and at their inner ends to the desired ones of the flanges 8 and 11. In the form of the invention shown in Figures 1 to 4 inclusive, the spokes nearest one side of the rim are connected to the flange 11 at the same side of the wheel, while the spokes nearest the other side of the rim are connected to the flange 8 at the latter side of the wheel, thus disposing the spokes in inwardly diverging relation from the rim to the hub when viewed in transverse section as shown in Figure 3. This is accomplished by connecting the opposed ears 13 of each pair by means of a transverse pin 14, the ends of which are hooked to engage in said ears, and the central portions of which are formed in crank formation as shown at 15 for reception of the eyed outer ends of the spokes 12. The ears 13 may be moved integral with the rim or any one of the bands 5 thereof, but in the form shown, they are constituted by a looped end portion of U-shaped wire clip 16, the parallel intermediate portions of which are seated in two adjacent grooves or channels in the corrugated tire 6. The inner ends of the spokes 12 may be directly connected with their respective flanges 8 and 11 by providing eyes upon the inner ends of said spokes that may be directly engaged in the proper ones of the circular series of marginal openings or apertures 17 provided in said flanges 8 and 11, but as shown the connection is made by means of a link 18 having eyes 19 at their inner ends engaged in the apertures 17 and having eyes 20 at their outer ends engaged with the eyes 21 of the spokes 12. This is best shown in Figure 5.

In either case, the ends of all of the spokes have a free pivotal and preferably loose connection with the rim and hub so that the spokes will not be twisted or bent when relative movement between the rim and hub takes place, or when the rim is deformed to absorb shocks and jars or to take up torsional strains. In other words, this connection of the spokes provides for a change in angular relation between the spokes and the rim and hub. As shown clearly in Figure 5, the inner end edge of the sleeve 9 is roughened or toothed as indicated at 22 to engage a similar surface of the larger end portion of the hub section 7, whereby accidental rotation of the sleeve 9 is prevented and its adjustment thereby maintained.

From the above description, it is apparent that rotation of the sleeve 9 will effect movement of the flange 11 toward or away from the flange 8, depending upon the direction of rotation to thereby effect placing of the spokes under the desired tension. An outward adjustment of the flange 11 tightens the spoke while an inward movement thereof will loosen the same for permitting renewal of any desired one of the spokes should they become damaged or worn.

The form of the invention shown in Figure 5 is exactly the same as that described above with respect to Figures 1 to 4 inclusive, except that the spokes that are connected at one side of the rim are extended across to the flange at the other side of the wheel, while the spokes at the other side of the rim are extended across to the remaining flange at the opposite side of the wheel, thus presenting the spokes in crossed relation as viewed in transverse section by this Figure 5. While this is the only structural difference of importance, it is noted that the spokes are directly connected to the ear 13 with the spokes thus crossed, the pins 14 being eliminated. The diverging relation of the spokes shown in Figure 3 is preferable with wider forms of rims, while the crossed relation thereof as shown in Figure 5 is preferable with narrower rims as shown in these two views.

From the above description, it will be seen that should the hub be secured upon the driving shaft or axle, the driving power will be transmitted from the hub through the spokes to the rim, the rim yielding under the pull of the spokes when undue torsional strain is presented, such as is experienced when a vehicle is started in motion. In a like manner, the wheel will absorb strains when brakes are applied for bringing the vehicle to a sudden stop.

In addition to the above, the deformable rim will effectively yield for absorbing shocks and jars due to irregularities in the ground, and this will take place without damage to the spokes due to their freedom of movement relative to the rim and hub. The absorption of torsional strain will take place in both directions due to the tangential and inwardly diverging arrangement of the spokes of each pair as shown in Figure 1.

A simple, durable and efficient spring wheel is thus provided, which may be cheaply and easily manufactured and assembled, as well as repaired.

What I claim as new is:

In a spring wheel of the character described, a resilient deformable rim, a hub disposed within the rim and having end flanges, tangential spokes normally connecting the hub and rim in concentric spaced relation, said spokes having pivotal connection with the hub flanges and the rim for swinging movement relative to the latter in the plane of the wheel and being arranged in pairs with the spokes of each pair arranged in inwardly diverging relation, means to adjust one of the hub flanges longitudinally of the hub toward and away from the other flange, said hub comprising a flanged section having a reduced end with an externally threaded sleeve rotatably disposed upon said reduced end, said adjustable flange having threaded connection with said sleeve.

In testimony whereof I affix my signature.

COMMODORE PERRY COZATT.